United States Patent
Lee

[19]

[11] Patent Number: 6,130,490
[45] Date of Patent: Oct. 10, 2000

[54] X-Y STAGE WITH MOVABLE MAGNET PLATE

[75] Inventor: Martin E. Lee, Saratoga, Calif.

[73] Assignee: Nikon Corporation, Tokyo, Japan

[21] Appl. No.: 09/287,545

[22] Filed: Apr. 6, 1999

[51] Int. Cl.[7] .............................. H02K 33/12; H02K 41/00
[52] U.S. Cl. .......................... 310/12; 414/935; 414/936; 310/15; 310/17
[58] Field of Search ............................... 318/135; 310/12, 310/13, 14, 17, 15; 414/222, 935, 936, 940; 108/102, 137, 143; 198/619

[56] References Cited

U.S. PATENT DOCUMENTS

| | | | |
|---|---|---|---|
| 4,409,860 | 10/1983 | Moriyama et al. | 74/479 |
| 4,667,139 | 5/1987 | Hirai et al. | 318/687 |
| 4,774,442 | 9/1988 | Teramachi | 318/135 |
| 4,916,340 | 4/1990 | Negishi | 310/12 |
| 5,040,431 | 8/1991 | Sakino et al. | 74/479 |
| 5,760,500 | 6/1998 | Kondo et al. | 310/12 |
| 5,838,079 | 11/1998 | Morohashi et al. | 310/12 |
| 5,858,587 | 1/1999 | Yamane et al. | 430/22 |
| 5,962,937 | 10/1999 | Wavre | 310/12 |

FOREIGN PATENT DOCUMENTS 10-12539  1/1998  Japan ............................ H02K 41/02

*Primary Examiner*—Nestor Ramirez
*Assistant Examiner*—Burton S. Mullins
*Attorney, Agent, or Firm*—Skjerven, Morrill, MacPherson, Franklin & Friel LLP

[57] ABSTRACT

A stage assembly for precision movement in the x and y-directions, especially adapted for use in electron beam lithography for holding a reticle. The stage assembly includes a vacuum enclosure in which a magnet plate structure moves in the y-direction under the influence of a linear motor with respect to the enclosure. Riding inside the magnet plate is the stage which holds the reticle and moves in both the x and y-directions. x-direction movement is accomplished by the stage moving under the influence of "turnaround motors" in the x-direction. A turnaround motor at each end of the stage is only on for a brief period in order to drive the stage relative to the magnet plate in the x-direction. Then the other turnaround motor at the other end of the stage turns on and stops the movement of the stage in that direction and drives it back in the opposite direction. Reaction forces used to move the stage are transferred to the ground independent of the electron beam column supports. Fine adjustments in position (or velocity) of the stage in the x-direction are accomplished by a set of linear induction motors having coils mounted on the magnet plate and corresponding aluminum plates mounted on the stage. The stage is suspended on a support surface by several unconstrained spherical bearings. Each sphere is of a very hard material and bears on corresponding hardened pad areas on the stage and on the support surface.

15 Claims, 15 Drawing Sheets

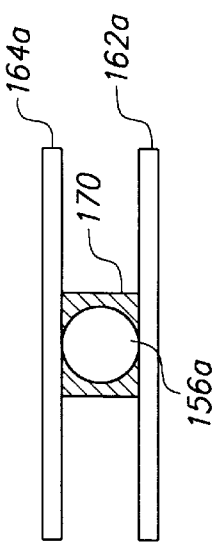
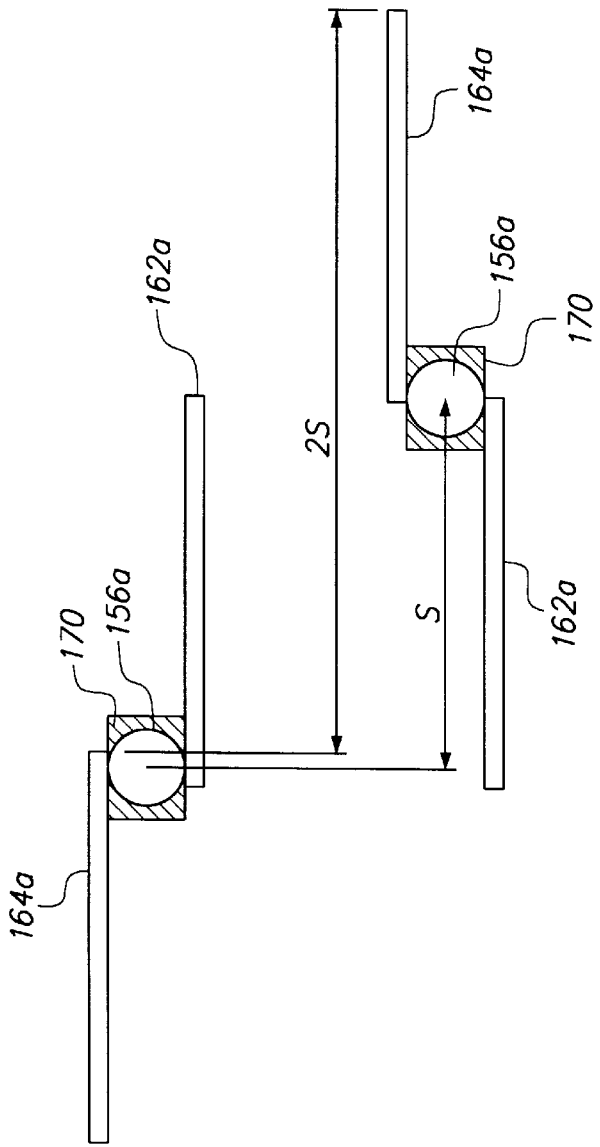

X-Y STAGE WITH MOVABLE MAGNET PLATE

FIELD OF THE INVENTION

This invention relates to precision motion devices and more particularly to X-Y stages.

BACKGROUND

X-Y stages are well known; they are typically used in machine tools and other applications where two dimensional precise movement is needed to position an object. An application of X-Y stages is in lithography equipment e.g. for semiconductor wafer processing. In this case, a stage is typically used in a lithography tool to position in two dimensions the reticle (mask). A separate stage is sometimes provided to position the semiconductor wafer. Such lithographically tools typically include a source of radiant energy for illumination such as a mercury or other lamp or laser or electron beam source, and a lens to focus the radiation which passes through the reticle onto the workpiece. This is an optical lens in the case of photolithography or an electron lens, which is an assembly of magnetic coils, in the case of an electron beam system.

In the case of electron beam systems, special problems are present since stray magnetic fields or electric currents may adversely affect the electron beam. Also mechanical and thermal disturbances are problematic since they reduce the resolution, positioning accuracy and positioning speed of the lithography process.

Hence there is a need for improved stages, particularly for use in electron beam lithography.

SUMMARY

In accordance with this invention, an X-Y stage is especially suitable (but not so limited) for use in an electron beam lithography system to movably support a reticle. Most current electron beam lithography systems do not use a reticle since their beam cross section is very small and the beam is used to "direct write" on the workpiece (wafer or mask). However in some cases a large cross section beam is used for illumination of a reticle pattern and an electron beam lens is used to transfer the illuminated image of the reticle pattern to the workpiece, similar to the use of a reticle in some photolithography systems. For this reason, a reticle stage is needed to move the reticle from pattern area to pattern area. However, the present invention is not limited to electron beam applications or to use with a reticle, but generally is directed to X-Y stages.

In accordance with this invention, a stage assembly is suitable for location within a vacuum enclosure. The stage assembly has three attributes in one embodiment. The first is that reaction forces used to move the stage are not transferred to the electron beam column but are transferred to the ground, independent of the electron beam column supporting structure. In other words, the force generating elements of the stage assembly are supported by a "reaction frame" independently from the electron beam column and from the weight of the reticle stage plate itself. This allows the stage to be driven without coupling resulting vibrations to the electron beam column or coupling outside vibrations to the stage.

The second attribute is that this stage uses no mechanical guides for its x or y-direction motions. This helps the stage fit in the typical narrow slot of the electron beam column, between the illuminator (source) section and the lens section (e.g. a 66 mm wide slot) while carrying e.g. a 300 mm diameter reticle. This also reduces the number of precision parts required for this assembly, which only with difficulty would need to be made vacuum compatible and could add bearing "noise" (vibrations) to the stage.

The third attribute is that "ball and flat" bearings are used to support the stage as it moves in the x and y-directions, making the bearing area compact as well as being vacuum compatible.

Thus the most critical motions of this system are those of the stage plate, and these motions are all measured relative to the lens section of the electron beam column. These motions are of three major types. The first is the scanning or constant velocity x-direction. This motion is made across the full x dimension of the reticle. During this constant velocity motion of the reticle stage, the electron beam illumination quickly moves from reticle subpattern to reticle subpattern to project each pattern's image on the workpiece.

The second is the step motion in the y-direction to the next scan stripe. This step is performed during the time the x-direction scan is changing its direction. Last is the vertical motion or Z-direction motion used to keep the reticle (carried by the stage) in the proper position for focus. This positioning occurs continuously while the system is in operation.

The first type of stage motion (scan in the x-direction) has three parts: launch, scan, and decelerate. The launch and de-accelerate motions are very similar. When the stage reaches the end of its scan, two of the linear motor armatures (coils) which drive the stage in the scan direction are inside the magnetic field of either the left or right side associated X-axis magnets. At this time current is applied to the armature with the proper polarity to decelerate the stage. The stage comes to a stop, then is launched (accelerates) back to the scan velocity, but in the opposite direction. The scan part of this move is controlled by two x-direction (induction) motors. These motors make small changes in the stage velocity as necessary to correct for outside disturbances (e.g. cable drag, bearing friction, vibrations).

A bearing system supports the weight of the stage on an underlying supporting surface (also referred to here as the z-axis plate). It is to be understood that the stage may be relatively large and heavy. Conventionally such stages are supported e.g. by air bearings or mechanical bearings. In accordance with the invention, a special kind of ball and flat bearing is used in which the bearings are each a single sphere. In one embodiment only four such spheres support the weight of the entire stage assembly. These spheres are not continuously constrained in a cage, like a conventional ball bearing, but instead move freely relative to the stage and the underlying support surface. Such a bearing is both simple and compact because if the stage moves a distance S along either the x or y-direction, the sphere itself only rolls a distance S/2. Therefore the associated bearing pads on the stage and the underlying support surface only need to be half the size of the total stage travel distance.

In one embodiment the stage is constructed of rigid non-magnetic, non-conductive material, e.g. ceramic such as silicon carbide, and for the most part is hollow, having an upper plate, a lower plate and intervening struts. The components are coupled together with a vacuum compatible vibration damping material such as Scotchdamp™ viscoelastic polymer.

Typically the workpiece (reticle) is held within the stage and rests on the stage's internal partitions or struts. Also in one embodiment interferometer mirrors, which are conventionally mounted on such a stage for interferometrically determining the stage position, rather than merely being mounted on the stage top surface instead are incorporated into the structure of the stage so that they are located close to the reticle so the associated thermal and mechanical disturbances only minimally disturb the position of the interferometer mirror surfaces with respect to the wafer positions. For instance, in one embodiment the mirrors are polished edge surfaces of the stage plate that holds the reticle. This desirably positions these mirrors in the plane of the reticle.

The present inventor has recognized that such electron beam column systems problematically are not particularly rigid structures internally. Since the magnetic coils' location in the column defines the electron beam position, the coils' location precision in the column is important. Therefore it is necessary to avoid adding any vibration to the lens (coil) section of the column. The present system is intended to do this, by providing a vibration isolation system including a large and massive "seismic" plate which typically rests on a foundation. This seismic plate supports the electron beam column structure. Extending through this seismic plate but not touching it are frame connection structures associated with the reticle stage drive. These frame connection structures are part of the reaction frame and thereby absorb vibration caused by x-y-Φ direction movement of the reticle stage. In one embodiment, side posts which extend from the reaction frame are connected to linear tracks which act like drawer slides on which a magnet plate moves back and forth. The magnet plate moves relative to the average y-axis position of the reticle stage. These side posts pass through the reticle stage housing, and are vacuum sealed with bellows thereto which provide the vibration isolation, thus preventing transmission of vibration to the reticle stage housing. In this way, the reaction forces used to move the reticle stage are transferred to the ground via the reaction frame independent of the electron beam column supports.

The lower portion of the system, which typically includes a wafer stage, also rests on the seismic plate. Also provided are a set of force actuators operating in the z axis (vertical direction) to provide precise location vertically of the reticle stage for purposes of focusing. This is a very small amount of movement. In one embodiment this vertical adjustment is carried out by a combination of pneumatic actuators, stepper motors, and electric force actuators. See copending commonly owned U.S. patent application Ser. No. 09/289,249 filed Apr. 9, 1999 entitled Vertical Direction Force Transducer, commonly invented, incorporated herein by reference in its entirety, for an example of such a force actuation system. Of course, other types of vertical adjustments may also be used.

The electron beam column is flexibly sealed to the vacuum enclosure which encloses the reticle stage and spherical bearing loads are spring loaded to the vacuum enclosure. Thus, any vibration of the vacuum enclosure is spring loaded to all important components. Hence the elements of the system that generate force rest directly on the foundation. The other elements, which are the electron beam column, the wafer stage, and the reticle stage itself, rest instead on the seismic plate (which also typically in turn rests on the foundation).

In one embodiment, the various cables, for instance for power, control, cooling, vacuum, etc. to the electron beam column have their own vibration isolation via another support which also rests on the foundation. A typical reticle size for such a system is 12 inches diameter (300 millimeters) with the other system components scaled accordingly. Of course, this is not limiting.

BRIEF DESCRIPTION OF THE DRAWINGS

FIGS. 7A and 7B illustrate operation of the unconstrained spherical bearing in accordance with this invention.

DETAILED DESCRIPTION

The following description is directed to a stage which (in the disclosed embodiment) is adapted for use with an electron beam lithography tool in order to hold a reticle for positioning therein. The remainder of the tool is not shown as being conventional. However the present invention is not limited to this particular application, as will be understood by one of ordinary skill in the art, and certain features of the disclosed apparatus therefore may be modified as suitable for other applications and still fall within the scope of the invention.

Figure 1:
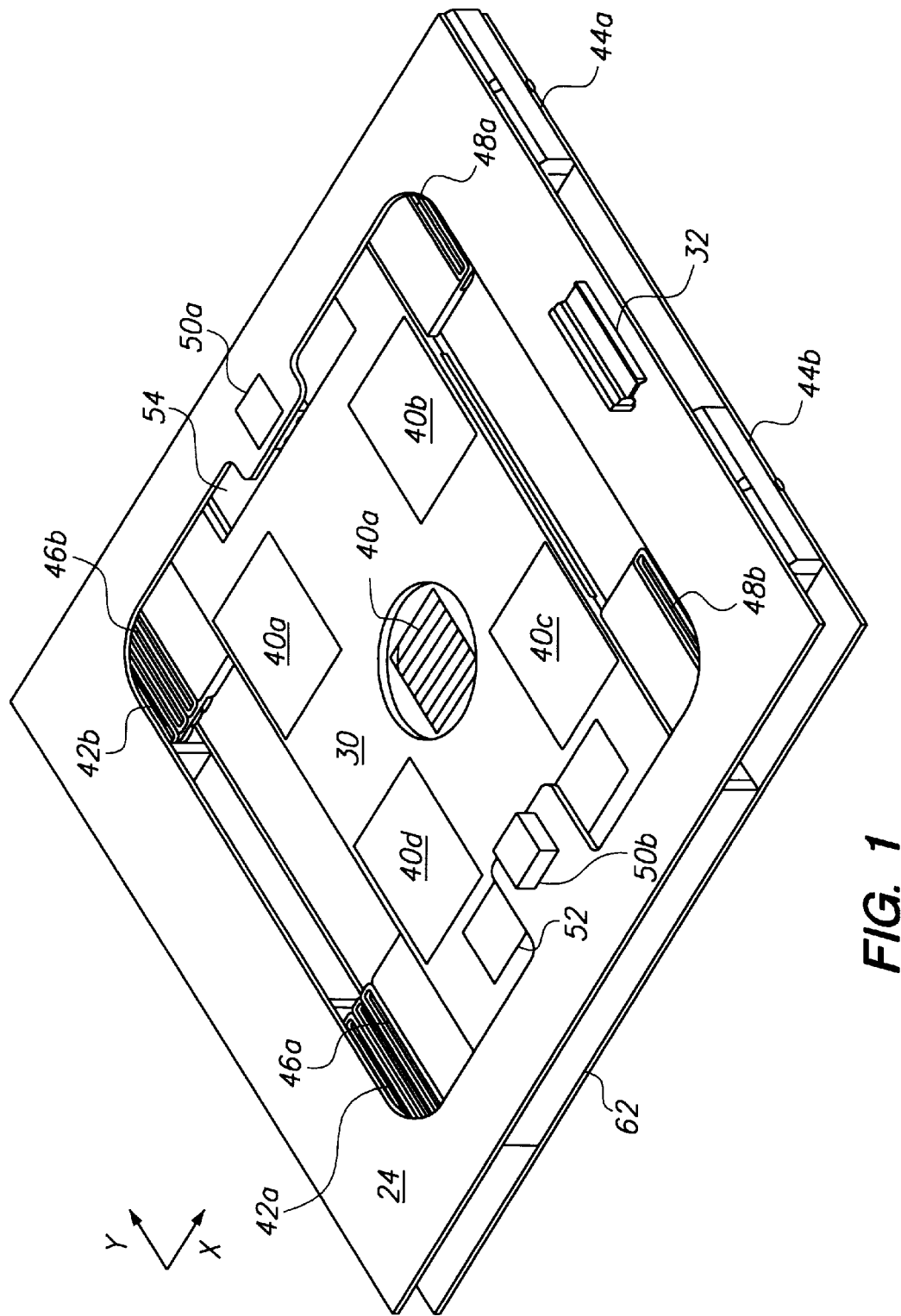
FIG. 1 shows a stage assembly in accordance with this invention.

FIG. 1 shows a stage assembly in accordance with this invention. It is to be understood that this and the accompanying figures are somewhat simplified for purposes of understanding. In general the dimensions of the structures described herein are not critical but may be adapted for various purposes. Thus the size of the stage and travel in both the X and Y directions of the stage and magnet plate, the size of the object to be accommodated on the stage, the power of the various linear motors, and the general electrical and magnetic properties are application dependent. Also the materials disclosed herein are not limiting but instead are illustrative of suitable materials.

Figure 9:
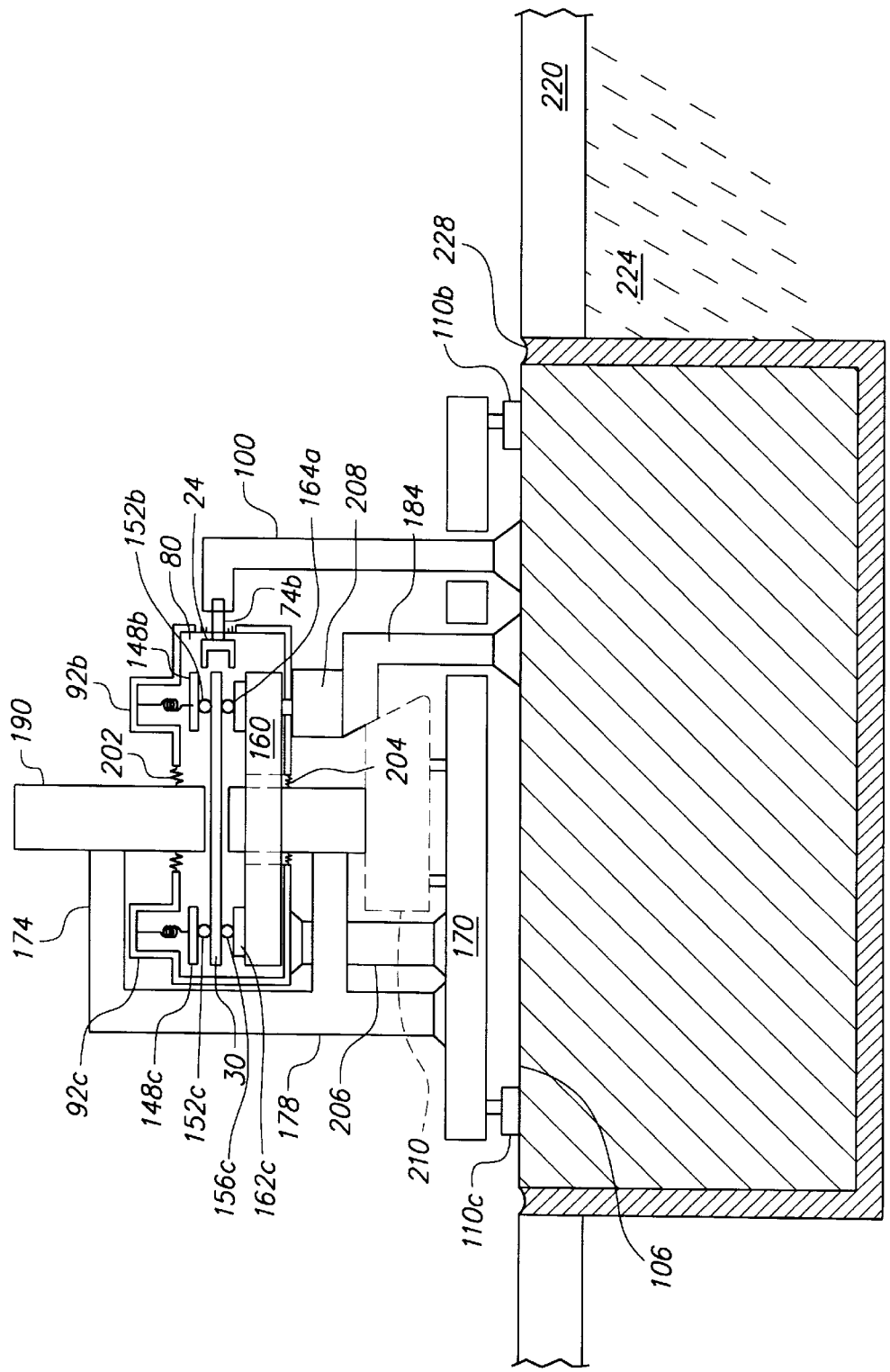
FIG. 9 shows a side view of the electron beam lithography system showing a portion of the support structure and foundation.

The stage assembly is typically inside a housing or enclosure or frame (not shown). It is to be understood that in certain embodiments (electron beam lithography) this housing is sealed to maintain a vacuum inside. However, this is not necessary. Moreover the housing may be modified as needed or may be incorporated in some other structure. In one application, the entire stage assembly is a part of an electron beam lithography tool for carrying the reticle, the remainder of which is shown in FIG. 9. The direction axes, which are selected arbitrarily, are illustrated in the figure for purposes of orientation.

Typically the electron beam which is impinging upon the reticle 20 descends vertically in the Z direction. The reticle 20 itself is not a portion of the stage assembly but merely is placed thereon as needed. Two main structures are shown in FIG. 9. The first of these is the magnet plate 24 and the second is the stage 30. The magnet plate 24 includes internal structures as described below.

The magnet plate 24 moves only in the y-direction, driven by two conventional linear motors. Such linear motors are commercially available and typically include a linear magnetic track which is a set of permanent magnets and an associated motor coil which rides within the magnetic track. Application of electric current to the motor coils drives the magnet plate 24, which is coupled rigidly to the motor coils, relative to the associated magnet tracks in the y-direction. The amount and speed of movement are conventionally controlled by providing variable mounts of electric current to the coils, at the proper phase.

One linear motor which drives the magnet plate 24 in the y-direction includes a coil assembly 32 mounted to the side (or near the side) of the magnet plate 24, and an associated magnet track (not shown) which is held within the enclosure. (A similar motor/coil set is located at the other end of the magnet plate 24 but is not visible in FIG. 1.) The actual configuration of this linear motor of course is dependent upon the masses to be driven and the acceleration desired.

The associated electric current-carrying wires coupled to the linear motor coil 32 are not shown. Neither are shown the tubes which conventionally carry coolant to cool such a linear motor. It is to be understood that in most such stage applications it is desired to remove the heat generated by the linear motors to allow more precise metrology, e.g. determination by interferometry of the position the reticle pattern at any one time.

Stage 30 fits within magnet plate 24, but is controlled independently. The magnet plate 24 is driven in the y-direction by operation of the linear motor 32, so as to "follow" movement of the stage 30 in the y-direction, as further described below. The magnet plate follows at the average velocity of the stage plate. There is sufficient clearance to allow the stage plate to reset to its new position at the end of each scan without substantially changing the velocity of the magnet plate.

Other elements shown in FIG. 1 include bearing pads (surfaces) 40a, 40b, 40c and 40d on stage 30. These are not for the bearings referred to above which support the weight of the device. Instead in one embodiment a "preload" is applied to push the entire stage 30 down onto its supporting surface (not shown in FIG. 1). This preload is provided by another set of spherical bearings which ride on the bearing pads 40a, etc., further detail of which is provided below.

Figure 2A:
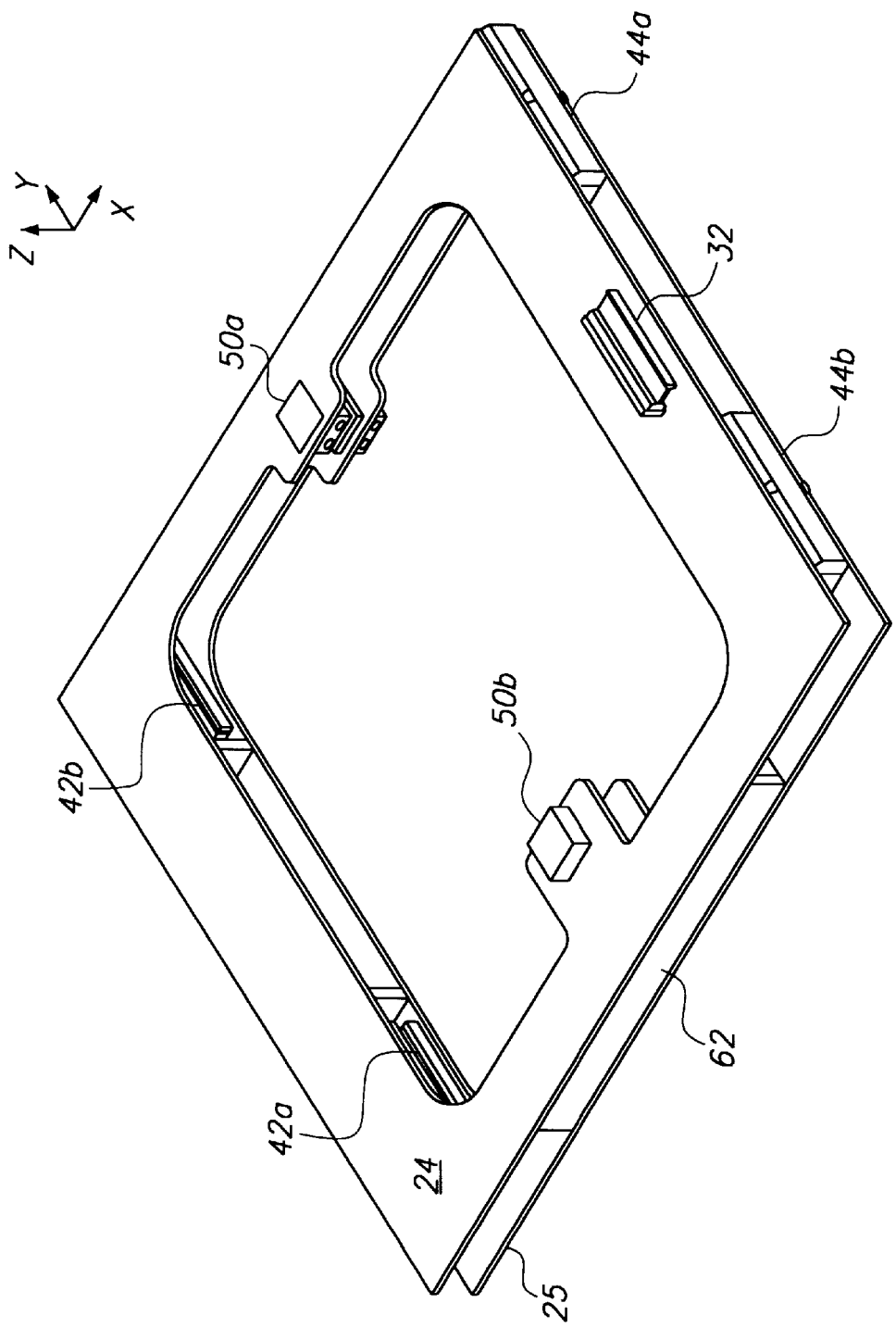
FIGS. 2A, 2B show the magnet plate of the stage assembly of FIG. 1.
Figure 2B:
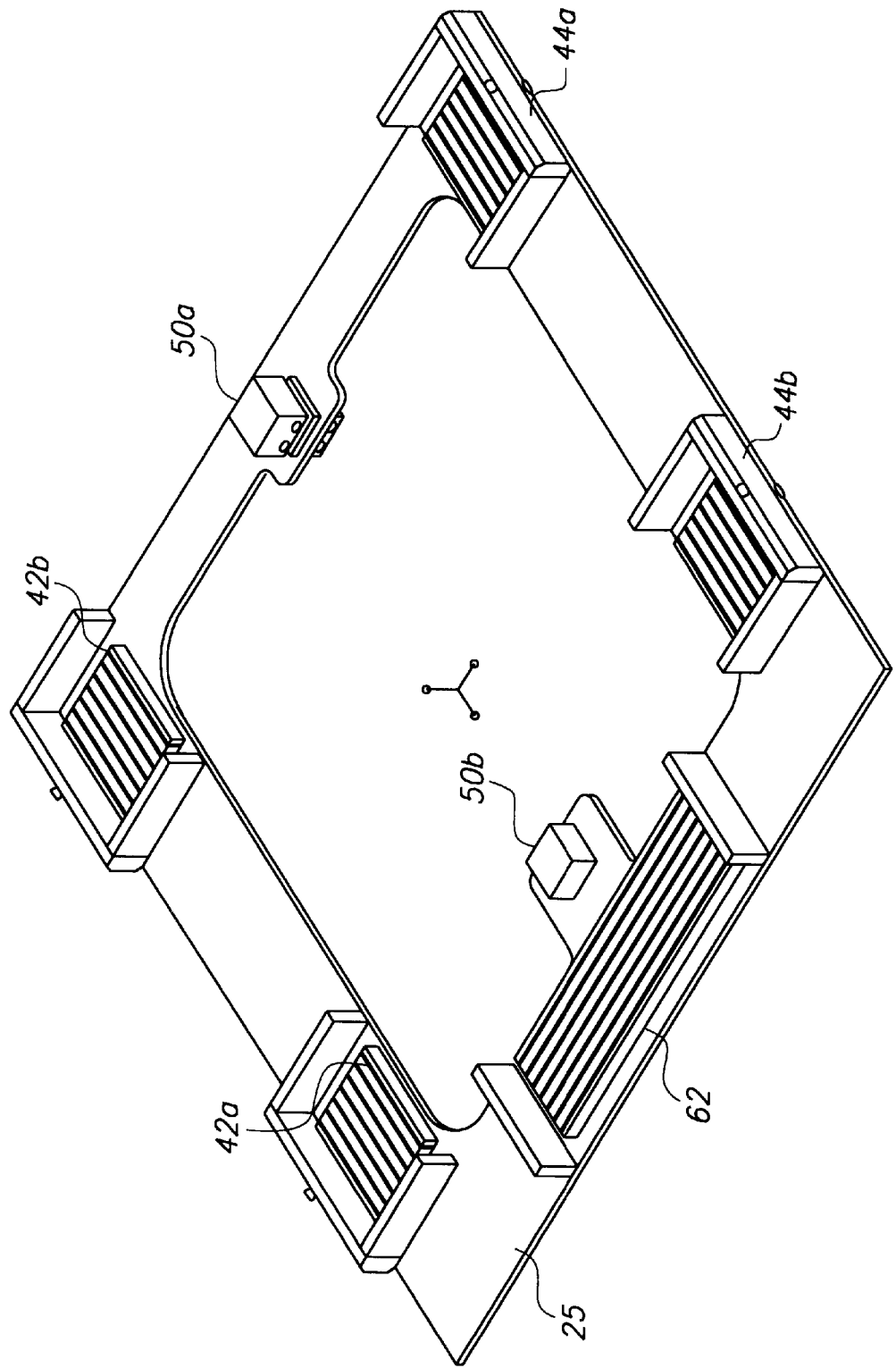
Figure 3:
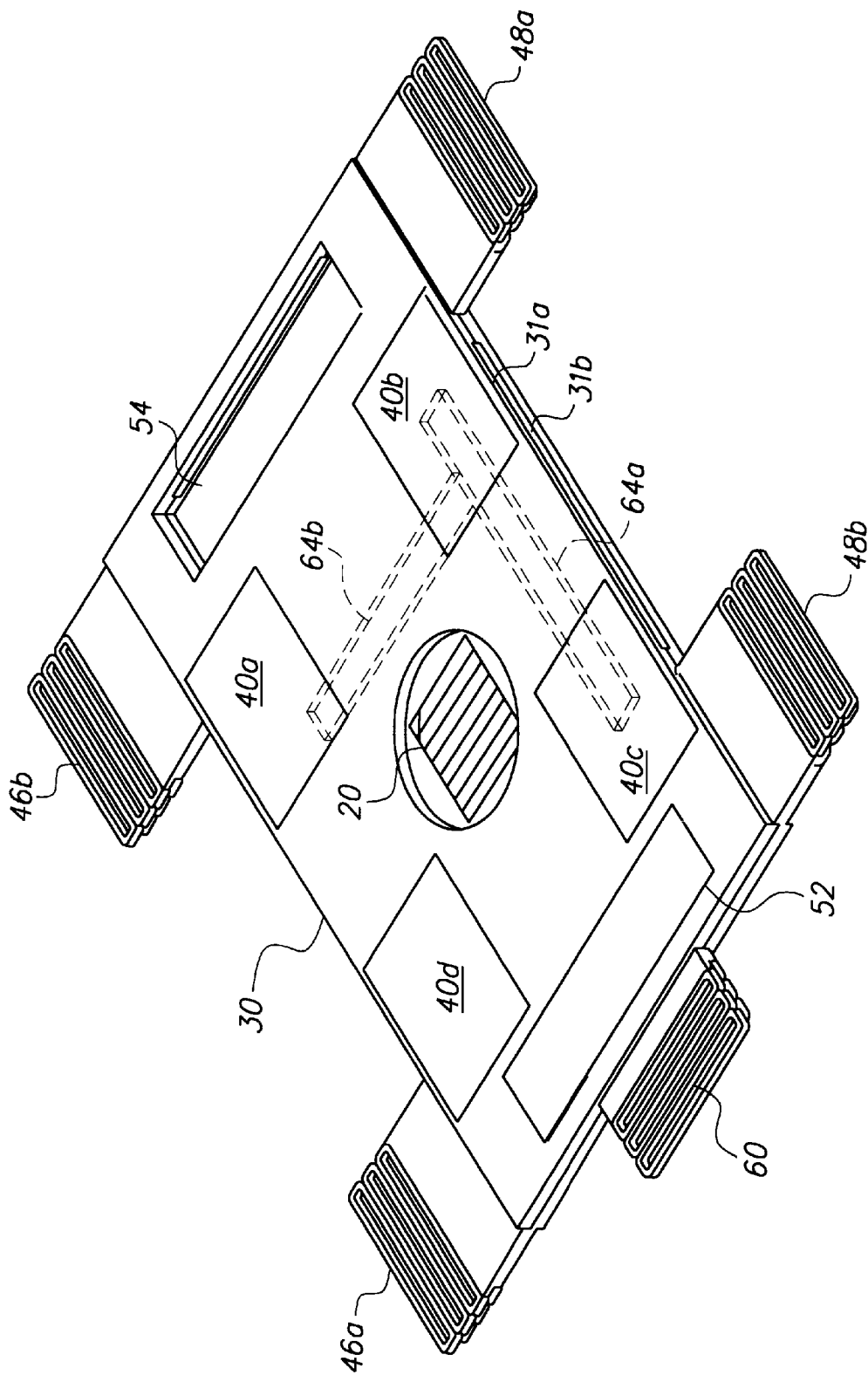
FIG. 3 shows the stage of the stage assembly of FIG. 1.

FIG. 1 is better understood with reference to FIGS. 2A, 2B and 3 which show separately (disassembled) the magnet plate 24 and the stage 30.

FIG. 2A shows the magnet plate 24 as a rectangular structure with a large opening in the center for the stage 30 to move therein in both the X and Y-directions. In this embodiment the magnet plate 24 includes an upper plate and a lower plate 25 fastened together; however this is not limiting.

Visible in FIG. 2A are the X-direction "turnaround motor" magnets 42a and 42b also partly visible in FIG. 1. Also visible in FIG. 2 are the linear induction motor coils 50a and 50b both located on a extension portion of the magnet plate 24. Also visible in FIG. 2A is the back portion of y-direction linear motor magnet 62.

As seen in FIG. 2A, motor coils 50a and 50b are inverted relative to one another. In that sense they are offset in the vertical (z axis) direction. This is so that the force generated by these two motors passes through the center of gravity of the stage 30 while also allowing the interferometer's measurement beam to measure the reticle's position at the same Z elevation as the center of gravity. Hence, motor coils 50a and 50b are identical, but one is upside down relative to the other.

In the right hand portion of FIG. 2A can be seen the rearmost portions of the other set of x-direction "turnaround" motor magnets 44a and 44b.

FIG. 3 shows detail of the stage 30. The structure shown here are the same as described above, but in more detail including the various motor coils. It is seen how the two interferometer mirrors 64a and 64b (shown in dotted lines) are actually interior portions of the stage 30 structure which are polished to form reflective surfaces and are in intimate contact with the actual reticle holder, which is the central portion of the stage 30. Interferometer mirrors 64a, 64b, are mounted within the stage 30, so they are close to the location of the reticle 20. The interferometer mirrors and the reticle holder are part of a rigid structure in the stage 30 which is kinematically mounted to the remainder of the stage 30 to minimize any reticle distortion.

It is seen here how the induction motor drive plates 52 and 54 are not in the same horizontal plane but are offset slightly to correspond to their respective motor coils 50a and 50b in terms of vertical location. This offset of the motors in the vertical (z axis) direction minimizes any undesirable moments while also allowing the interferometer's measurement beam to measure the reticle's position at the same Z elevation as the center of gravity. It is seen here how the stage 30 is actually a composite structure thereby defining internal voids as seen by its configuration including an upper portion 31a and a lower portion 31b.

With reference also to FIG. 1 it can be seen how this stage assembly operates. Stage 30 has mounted at its lefthand end the x-direction turnaround motor coils 46b and 46a which respectively interact with the x-direction turnaround motor magnets 42a and 42b. Similarly the x-direction turnaround motor coils 48a and 48b located on the righthand end of stage 30 interact with respectively the x-direction turnaround motor magnets 44a and 44b. Thus the coil/magnet pair 46a/42a is a turnaround motor as is the pair 46b/42b and the other two pairs 48a/44a and 48b/44b. These turnaround motors operate as described above. As the stage 30 moves in the x-direction back and forth within the magnet plate 24, each turnaround motor is energized only for a portion of the stage movement, because the motor coils move in and out of the respective motor magnetic fields. Thus the stage 30 shuttles back and forth along the x-axis driven by operation of the two sets of turnaround motors, each set of which is only active when the respective motor coil is within its associated magnetic field. The force of these turnaround motors is enough to drive the stage 30 back and forth along the x-axis within the magnet plate 24.

The required force exerted by these turnaround motors is determined by the mass of the stage and by the desired amount of acceleration of the stage. The turnaround motors are operated so that each turnaround motor not only launches the stage, but before launching, it also stops the stage movement in the opposite direction. The four turnaround motors are independently controlled, to provide precise θ (theta rotational direction) movement.

The magnet plate 24 moves at a constant velocity in the y-direction as driven by its motor coil 32 interacting with associated magnet track 36 (see FIG. 4A) to follow the y-direction movement of the stage 30. The magnet plate 24 is driven (at low acceleration, by relatively low power motors) so that the magnets 42a, 42b and 44a, 44b mounted on it are kept in the proper position so as to interact with the associated coils 46a, 46b and 48a, 48b. The magnet plate 24 is thus controlled in its y-direction movement so that it never physically touches the stage 30. This maintains vibration isolation from magnet plate 24 to stage 30. Thus this x and y-direction movement allows a conventional serpentine pattern of scanning and stepping of the reticle 20 located on the stage 30. It is to be understood that the various motors are controlled by e.g. a processor coupled to suitable conventional position sensing devices, not shown.

There may be a need for a fine adjustment of the velocity or position of the stage 30 in the x-direction which cannot be accomplished by operation of the turnaround motors. This adjustment is provided by the set of two dual x-direction linear induction motors. These are of a different type than the turnaround motor magnet/coils described above. Each linear induction motor includes a motor coil and an associated conductive element. For instance, one such dual linear induction motor includes the motor coil 50a on magnet plate 24 and the associated laminated aluminum plate 54 on stage 30. The second dual linear induction motor includes the motor coil 50b and the associated laminated aluminum plate 52 on stage 30. (The induction motors may not be needed if the turnaround motor coils remain a small amount in the associated magnetic fields.) The induction motor plates 52 and 54 are e.g. laminated aluminum embedded in the stage 30. These two dual linear induction motors allow further control of the x-direction movement of the stage 30 within the magnet plate 24.

This is accomplished for instance when the stage 30 is in its middle position, halfway between each end of the magnet plate 24, and hence none of the turnaround motors can function since none of their coils are inside the associated magnetic fields. Also, these linear induction motors allow fine adjustment of the stage 30 velocity in the x-direction as needed.

The two pair of linear induction motors which respectively include (1) coil 50a and associated plate 54 and (2) coil 50b and associated plate 52, are operated so that in each dual motor there are two coils, and each coil is always on, and one "bucks" the other in terms of operation, i.e. they drive in opposite directions by exerting constant force. Thus in order to move the stage 30 relative to the magnet plate 24 in the x-direction using these linear induction motors, the current supplied to one linear induction motor coil in each motor is increased slightly relative to that supplied to the other, thus causing movement in the desired direction along the x-axis. This bucking provides a faster response since the magnetic field for each motor coil is always on and there is no need to build up a magnetic field in order to achieve motion in the x-direction, this improves response time of these linear induction motors.

Also shown in FIGS. 1, 2A, 2B and 3 is a single y-direction linear motor for driving the stage 30 in the y-direction. This y-direction linear motor includes magnet track 62 which interacts with a motor coil 60. Thus motor coil 60 provides force as it reacts with the y linear motor magnet 62 driving the stage in the y-direction, thereby holding the correct y-axis position of the stage relative to the electron beam column. The motor 32 prevents any physical contact between the magnet plate 24 and stage 30.

Any suitable materials may be used for these structures. In one application this stage assembly is used in an electron beam lithography tool, where the electron beam (housed in an electron beam "column") penetrates down through the circular hole in the center of the stage 30, impinges on the reticle 20, and passes therethrough. It is desirable to avoid influencing this electron beam by operation of the stage assembly. Hence this is one reason why the magnet plate 24 is used; this locates the powerful permanent magnets, e.g. 42a, 42b, 44a, 44b and 62, away from the electron beam. Also the stage 30 and magnet plate 24, to the extent possible, are made of a non-magnetic, non-conducting material such as silicon carbide, for maximum stiffness and minimum weight. The interiors of both magnet plate 24 and the stage 30 to the extent possible are hollow with rigid internal struts or partitions providing rigidity.

The internal elements of the stage 30 are coupled together with a vacuum compatible vibration damping material such as Scotchdamp™ viscoelastic polymer from 3M Corporation. This material is vacuum compatible, because typically the stage assembly is in a vacuum enclosure 80 (see FIG. 4B).

In one embodiment, the components of this stage assembly are of non-conductive material (e.g. ceramic) so as to minimize any eddy currents, thus reducing any undue influence on the electron beam. In one embodiment the entire height of the stage assembly shown in FIG. 1 (including its vacuum enclosure) is above only 66 millimeters (approximately 2.5 inches) so that it easily fits within a narrow "slot" (vertical clearance) in an electron beam lithography system.

The parts of the stage assembly located within the vacuum are typically provided with a conductive coating, for instance a thin metal film, which has a high resistivity but is conductive enough to avoid any charge buildup while not conductive enough to support an eddy current.

Figure 4A:
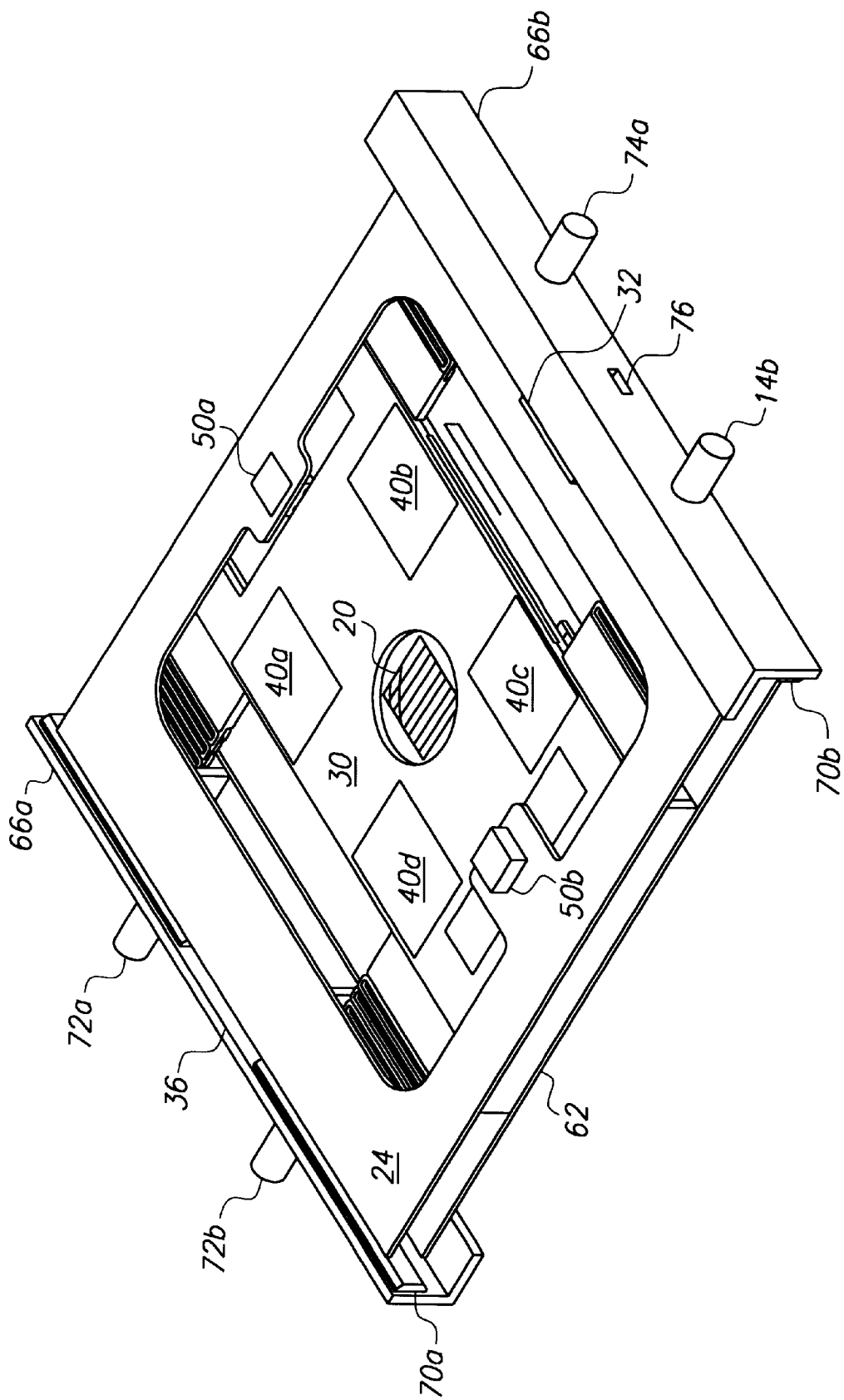
FIG. 4A shows additional elements of the stage assembly of FIG. 1.

FIG. 4A shows the reticle stage assembly of FIG. 1 with the addition of support structures, in this case a portion of the reaction frame. The reaction frame includes, on the left hand side, linear track support 66a and the right a corresponding track support 66b. These two track supports are essentially the same, except inverted with respect to one another so that their combined drive force is through the stage assembly center of gravity. Each of track supports 66a and 66b has mounted inside it a corresponding ball bearing track 70a and 70b (only a small portion of track 70b is visible). The magnetic plate 24 moves to the left and right along these tracks 70a and 70b the way a drawer moves on its tracks. Ball bearings are provided at suitable places on the magnet plate (in FIG. 1., four ball bearings can be seen). As mentioned above a drive motor coil 32 and another similar drive motor coil (not visible on the underside of the magnet plate) interact with the corresponding magnetic tracks.

Figure 4B:
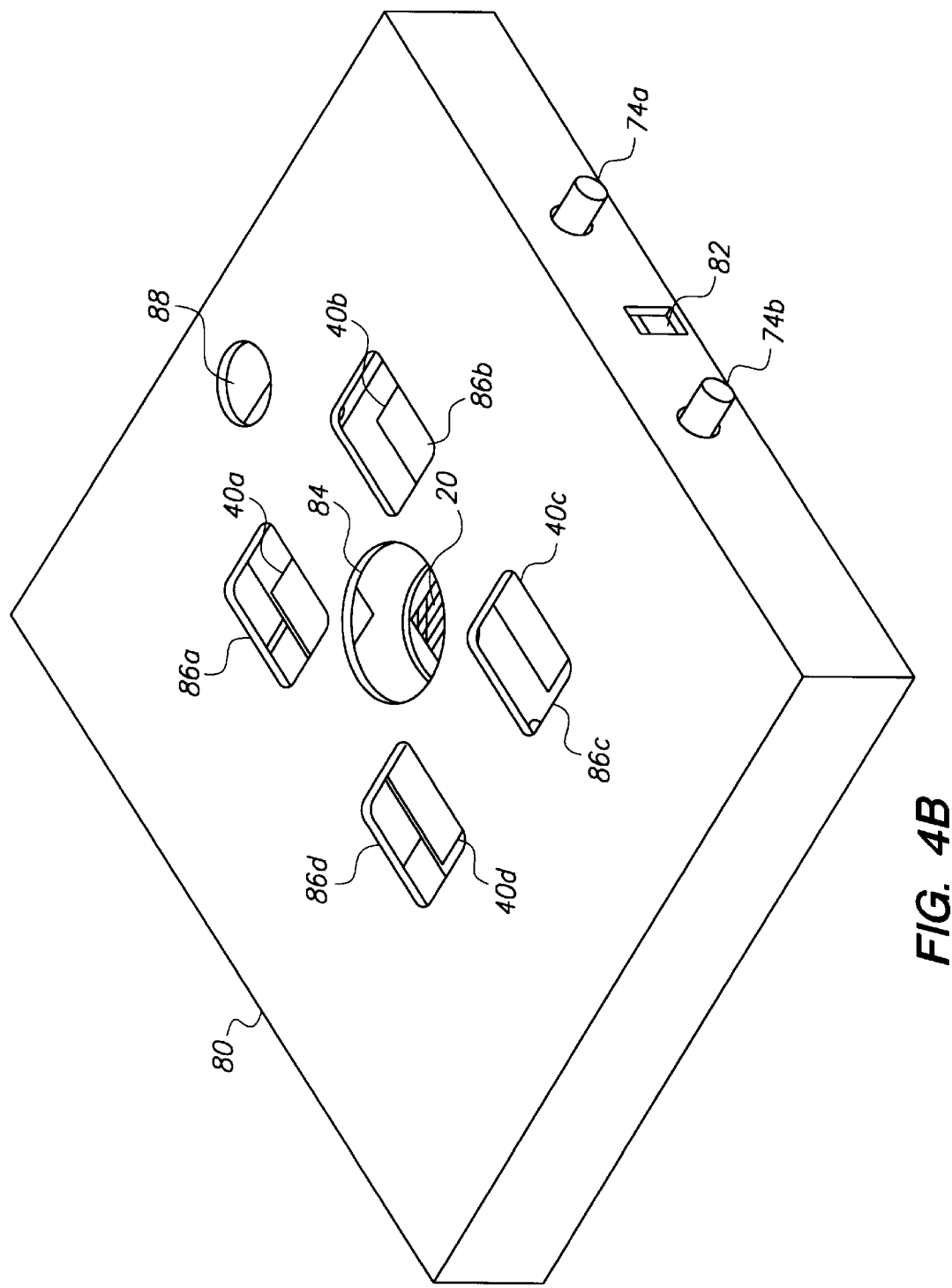
FIG. 4B shows a vacuum enclosure for the FIG. 4A structure.

Also shown in FIG. 4A are support posts 72a, 72b and 74a, 74b. These pairs of short support posts are respectively rigidly connected to the track supports 66a and 66b to mechanically support the track supports. These support posts bear the weight of the track supports 66a and 66b, and also that of the magnet plate 24. Also, defined in the track support 66b is an aperture 76 for passage of an interferometer laser beam. This laser beam impinges upon the mirror on the stage plate 30 shown in FIG. 3. (This is mirror 64a, not visible in this drawing.) FIG. 4B shows the structure of FIG. 4A with the addition of the surrounding vacuum enclosure 80 including a window 82 which allows passage of the interferometer beam mentioned above. As shown, support posts 74a and 74b extend out through the vacuum enclosure and are sealed thereto by for instance, stainless steel bellows (not shown) to preserve the vacuum. Similar bellows cover unseen posts 72a and 72b. The vacuum enclosure 80 defines several other openings (which of course are sealed in the final assembly). These include central opening 84 for passage of the electron beam, to which the electron beam column is sealably attached. Also provided are openings 86a, 86b, 86c and 86d for the preload structures which are described hereinafter. Opening 88 is for connecting a vacuum source to the chamber.

Figure 5A:
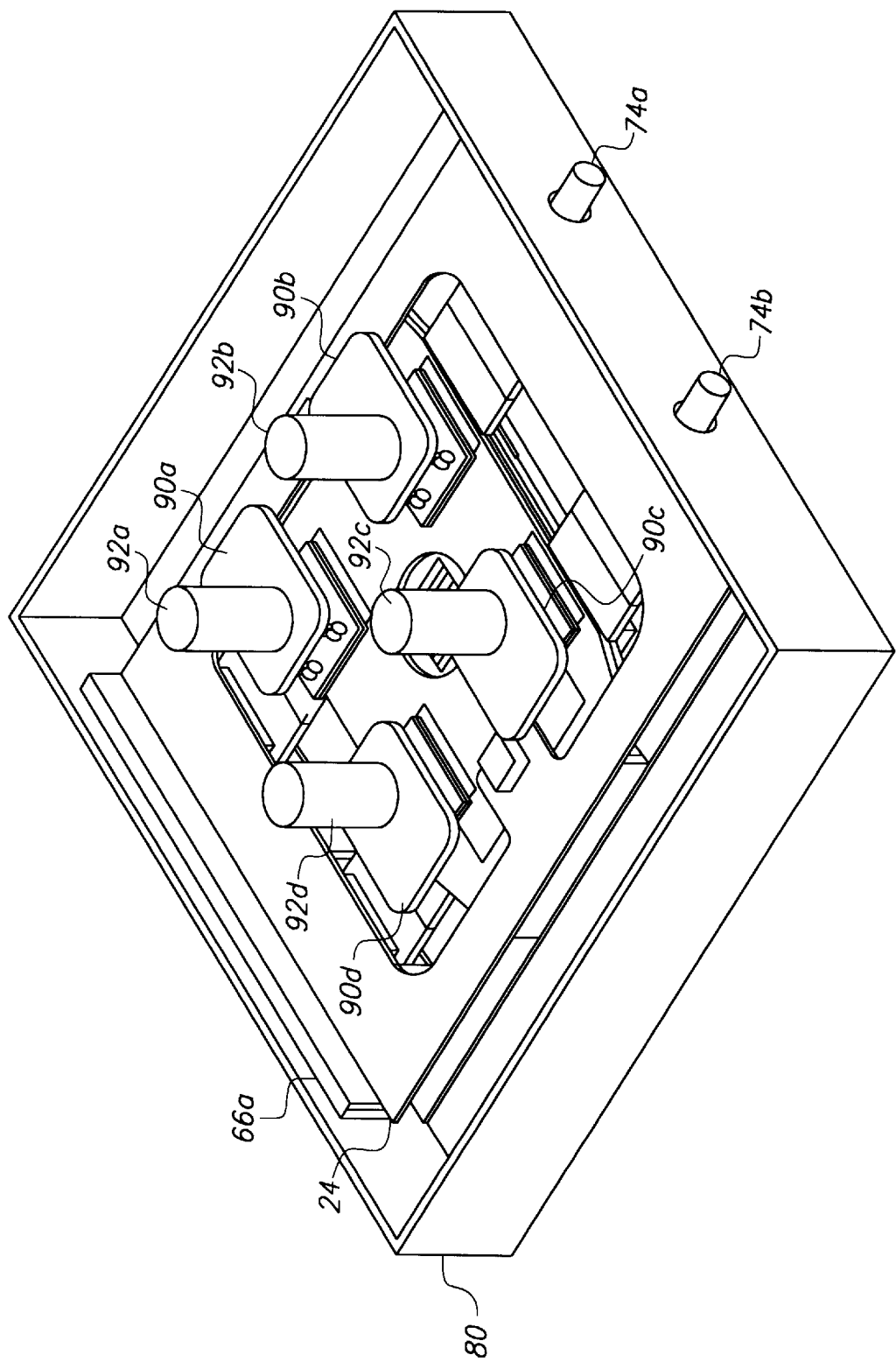
FIG. 5A shows a cutaway view of the structure of FIG. 4B.

FIG. 5A shows a partial cutaway view of the structure of FIG. 4B with the top portion of the vacuum enclosure 80 shown removed. Of course this is only for purposes of illustration. FIG. 5A shows the housings for the four preload structures, the openings for which were depicted in FIG. 4B. These include the four preload cover plates, respectively 90a, 90b, 90c and 90d which are part of the assemblies which bear on the preload bearing spheres (not shown) which in turn bear on the preload pads 40a, 40b, etc. Associated with each preload cover plate is the preload structure extending vertically upward, of which in this case only the cylindrical housing portion is shown in simplified form as structures 92a through 92d. (Further description of these is given below.)

Figure 5B:
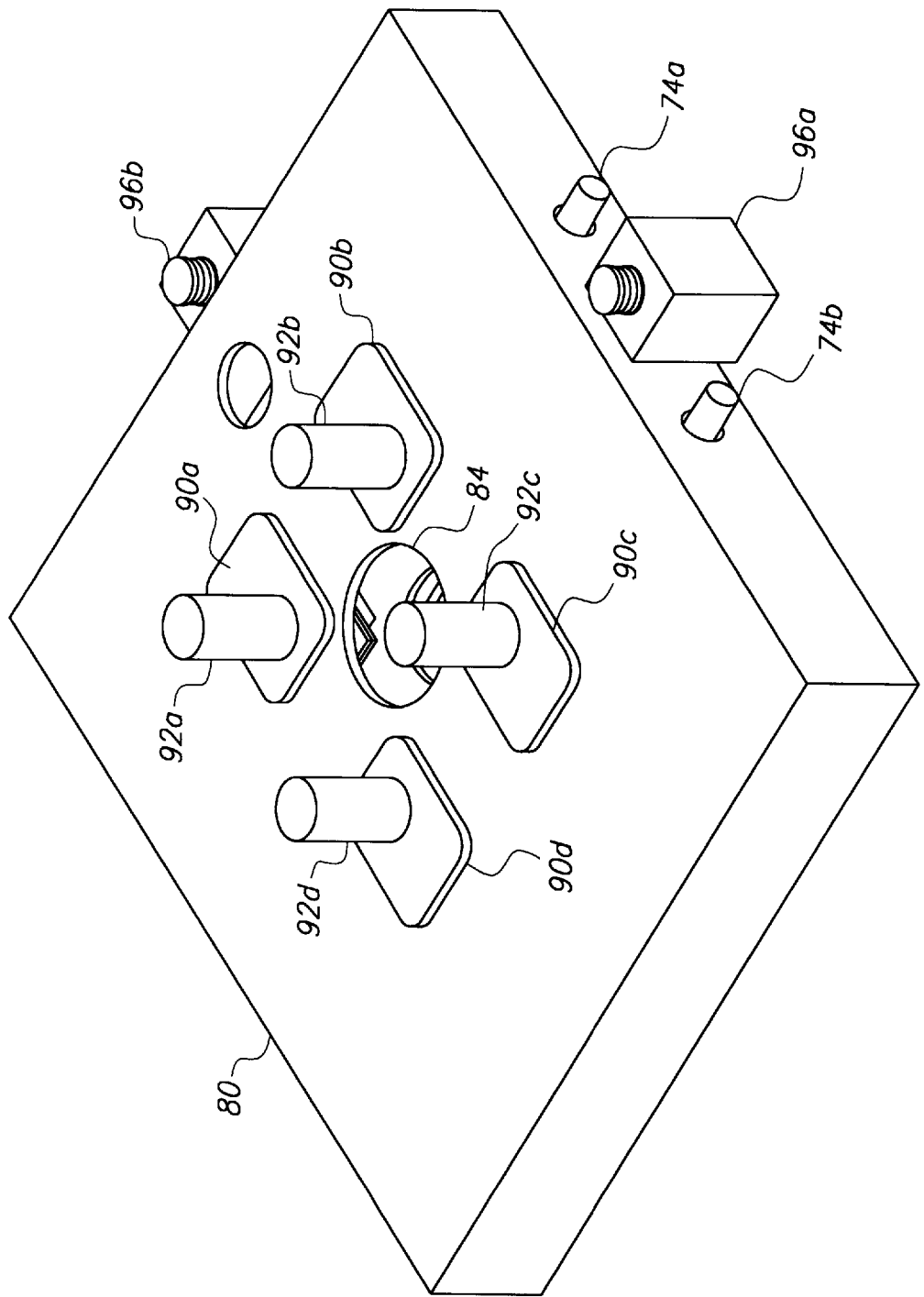
FIG. 5B shows additional elements of the FIG. 5A structure.

A somewhat different view of the FIG. 5A structure is shown in FIG. 5B with the entire vacuum enclosure 80 shown unlike in FIG. 5A where the top portion of enclosure 80 is shown removed. In this case the preload structures are shown in place covering up the openings in the top portion of the vacuum enclosure 80. The central opening 84 however is not shown covered up here since the associated closing structure is not depicted. Also shown in this view are the interferometer mounts 96a and 96b; interferometer mount 96a communicates with window 82 of FIG. 4B. A similar window is provided in the surface of vacuum enclosure 80 adjacent to mount 96b of FIG. 5B. These are the interferometers for determining the location of the stage in the x and the y-directions, relative to the electron beam lens column.

Figure 6A:
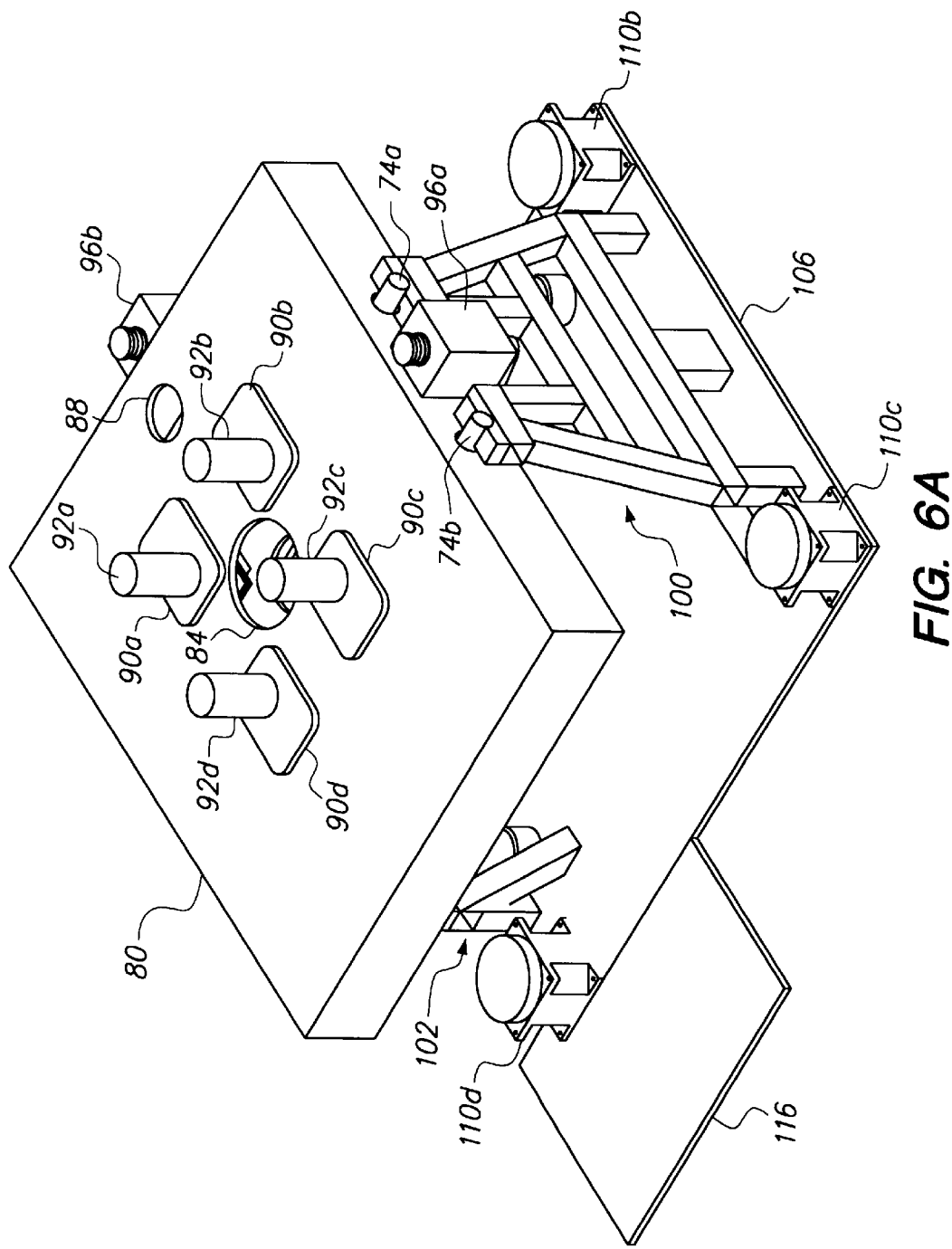
FIG. 6A shows the reticle stage assembly in the vacuum box with the ball loaders and a portion of the support structure.

FIG. 6A shows some of the identical structures of FIG. 5B with the addition of a portion of the above-mentioned reaction frame including vertical structure 100 which consists of a number of rigidly connected members which capture the posts 74a and 74b and hold them. Structure 100 rests on a foundation plate 106. A similar vertical structure 102 is at the left hand portion of the figure. Both structures 100 and 102 are part of the reaction frame and are in contact with foundation plate 106. Independently resting on the foundation plate 106 are four vibration isolation structures 110a (not visible), 110b, 110c and 110d which support the seismic plate (not shown in this figure). Note that the vertical structures 100 and 102 pass through this seismic plate as shown in later figures. Auxiliary foundation plate 116 is for purposes of mounting a wafer loader system (not shown).

Figure 6B:
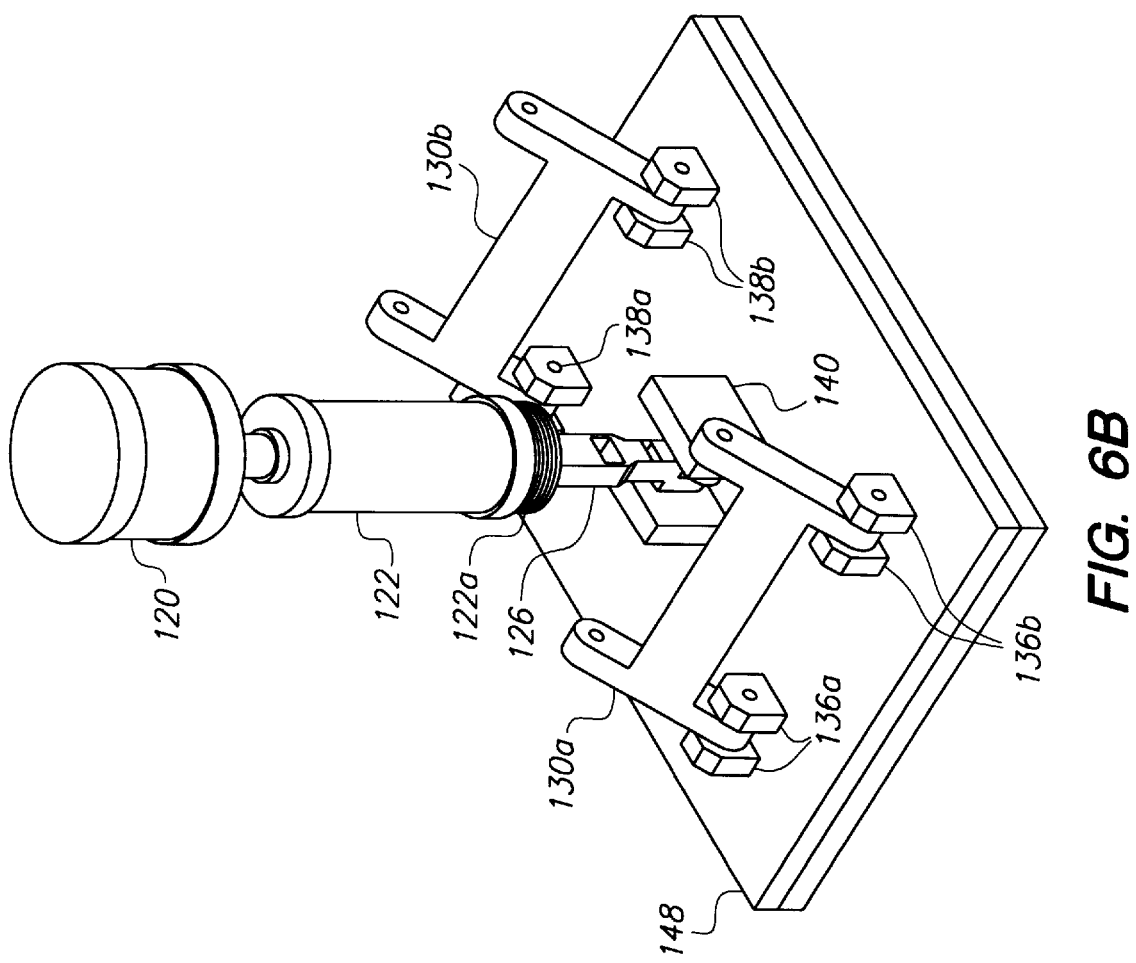
FIG. 6B shows one of the ball loaders in detail.

FIG. 6B shows detail of a selected one of the preload structures, in this case associated with preload cover plate 90a. All four of these preload structures are essentially the same so only one is shown in FIG. 6B. In FIG. 6B the housing 92a shown in FIG. 5B is not present. Also the preload cover plate 90a is not shown. The preload structure includes an upper portion 120 which is an air cylinder, and a lower portion 122 which is a spring with a bellows vacuum seal 122a. The force exerted downwards by air cylinder 120 and spring 122 is transmitted via a mechanical link 126, the lower portion of which is pivotally connected to a bracket 140. Bracket 140 is fixed on a preload plate 148. Also fixed on plate 148 are two sets of pivotal brackets 136a, 136b and 138a, 138b which in turn pivotally support arms 130a and 130b. For further understanding of how this structure operates, see FIG. 6C.

Figure 6C:
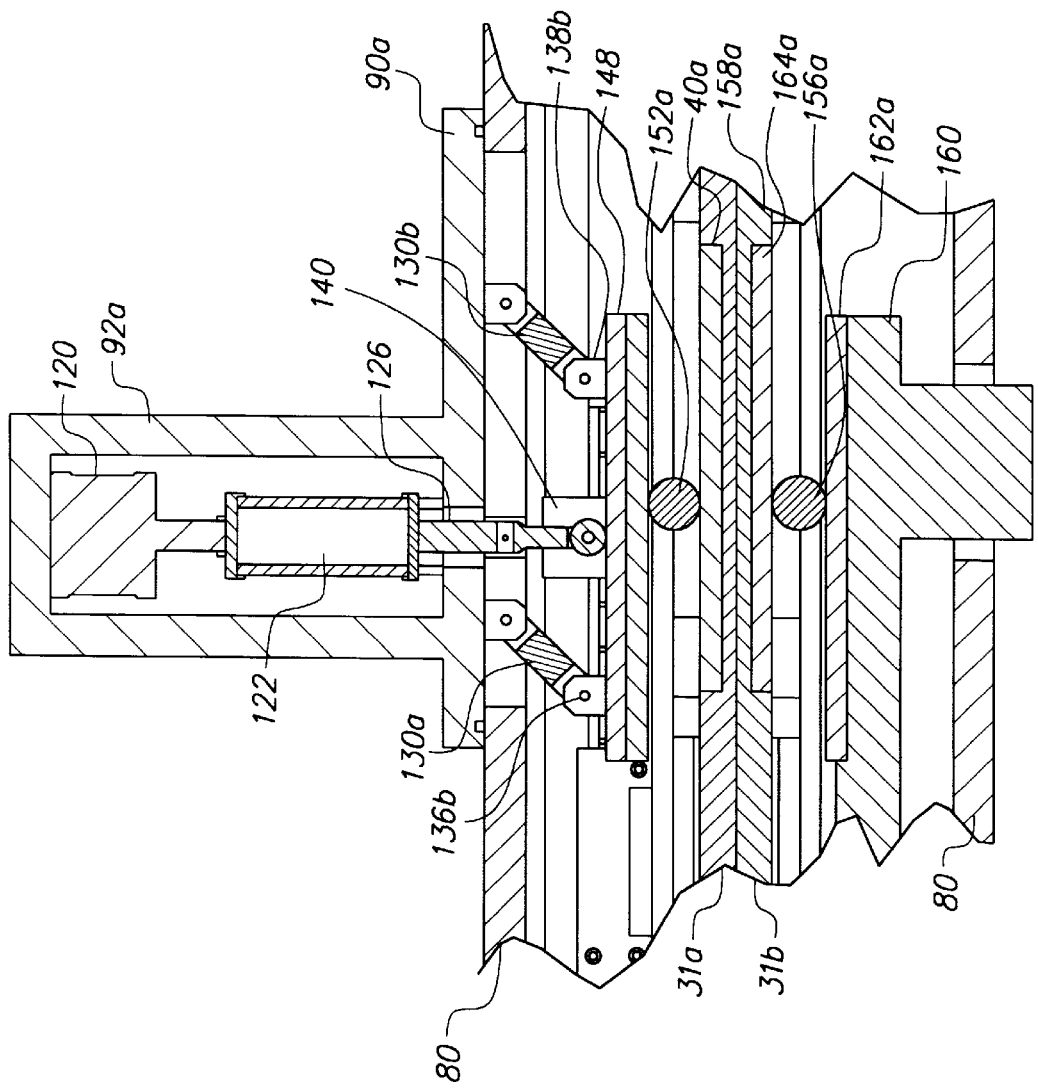
FIG. 6C shows a cross section of one of the ball loaders and the associated ball and flat bearings.

FIG. 6C is a cross-sectional view which shows the interior portions. FIG. 6C, like FIG. 6B, shows only a single preload structure, a single set of upper and lower spherical ball and flat surfaces and a portion of the stage support plate and a portion of the stage. This structure is replicated, for instance four times, in the entire stage assembly. Elements shown in FIG. 6C which are identical to those shown in the earlier figures have identical reference numbers. It is seen here how the preload structure 120, 122 and 126 rides inside its housing 92a and bears against the preload plate 148. Hence it is seen how the preload cover plate 90a is actually a seal and is not a force exerting element. The air cylinder has two positions. First it lifts the preload plate slightly to allow re-caging of the balls. Second, it slightly compresses the spring exerting the preload force on the preload plate and the stage below. Cover plate 90a seals against the vacuum enclosure 80, of which both the upper and lower portions are shown.

Thus the preload plate 148 pushes downwards on the preload bearing sphere 152a, the bottom surface of which rides on its bearing pad 40a which is a portion of the stage 30, which includes upper plate 31a and lower plate 31b as described above. This sphere 152a therefore is the upper sphere which provides the preload force pushing downwards on the stage 30. The mass of the stage 30 is borne by a lower bearing sphere 156a which is essentially identical to sphere 152a. The sphere 156a is supported in turn on a bearing pad 162a, also for instance of silicon nitride, which is a portion of the upper surface of a z-axis plate 160. This z-axis plate 160 extends underneath the entire stage 30 and bears its weight via four such spheres 156a. As shown, the lower portion of the z-axis plate 160 penetrates through the lower portion of the vacuum enclosure 80 and is sealed thereto by suitable seals such as stainless steel bellows. Thus as the stage moves in both the x and y-directions, continuous force is exerted downwards by the preload structure via the upper sphere 152a (and its companions, not shown) and the weight of the stage is born by the lower sphere 156a (and its companions). Thus the entire mass of the stage plus the preload force is born by the z-axis plate 160. The stage lower plate 31b includes a bearing pad 164a which is similar to pads 40a and 162a in terms of its material and size.

In one embodiment four preload spherical bearings push down on stage 30 and four supporting spherical bearings support stage 30 on the z-axis plate 160. However, this arrangement is not limiting. Each supporting bearing preferably is located directly underneath one of the preload bearings.

These spherical (ball and flat) bearings used to support the stage have a particular configuration in one embodiment, each spherical (e.g. silicon nitride) bearing sphere being laterally surrounded by a loosely fitting cylindrical lubricating bushing, for instance of Teflon®. This Teflon bushing does not cover the portions of the bearing sphere which bear against the respective bearing pads but laterally surrounds the bearing sphere, allowing the sphere to rotate therein. This bushing deposits a thin film of Teflon on the bearing sphere and the associated bearing pads, thus reducing friction. (Teflon has been found to be nonproblematic in a vacuum.)

FIGS. 7A and 7B show schematically operation of a single spherical bearing of this type. In this simplified view, the sphere 156a with its Teflon bushing 170 rides between the stage bearing pad 164a and a support plate bearing pad 162a. FIG. 7A depicts a neutral position of the stage 30 relative to the bearing pads. In FIG. 7B two extreme positions of the sphere relative to the bearing pads are shown. The upper portion of FIG. 7B shows an extreme leftwards position of the stage and the bottom portion of FIG. 7B shows an extreme rightwards position. In this case the total amount of travel of the stage is 2S. However the sphere 156a moves only distance S. Thus this bearing provides substantial travel with minimum movement of the spherical bearing itself. Hence the bearing pads can be relatively small in area thus making the entire stage assembly relatively compact.

As illustrated in FIGS. 7A and 7B, the bearing spheres are generally unconstrained, unlike a conventional ball bearing having a cage. In one embodiment these spherical bearings are intermittently caged. For instance, bearing spheres which are relatively large diameter, e.g. 1.25 inches, in one embodiment are subject to constraint by a fence or cage. This cage is moved into position only occasionally, e.g. once per wafer load in order to reposition the spheres.

This positioning is done e.g. by moving the bearing pads (which are fenced) to a corner of their travel with the preload off. Each pad has a 90° shaped low fence (rail) which is high enough to catch the teflon bushings on the spheres. With the preload off (or reduced from its normal amount) the stage is moved so as to trap each sphere between the two diagonal fence corners located respectively on the stage and the opposing plate. The stage is then moved further to nudge the ball to a predetermined position.

Figure 8A:
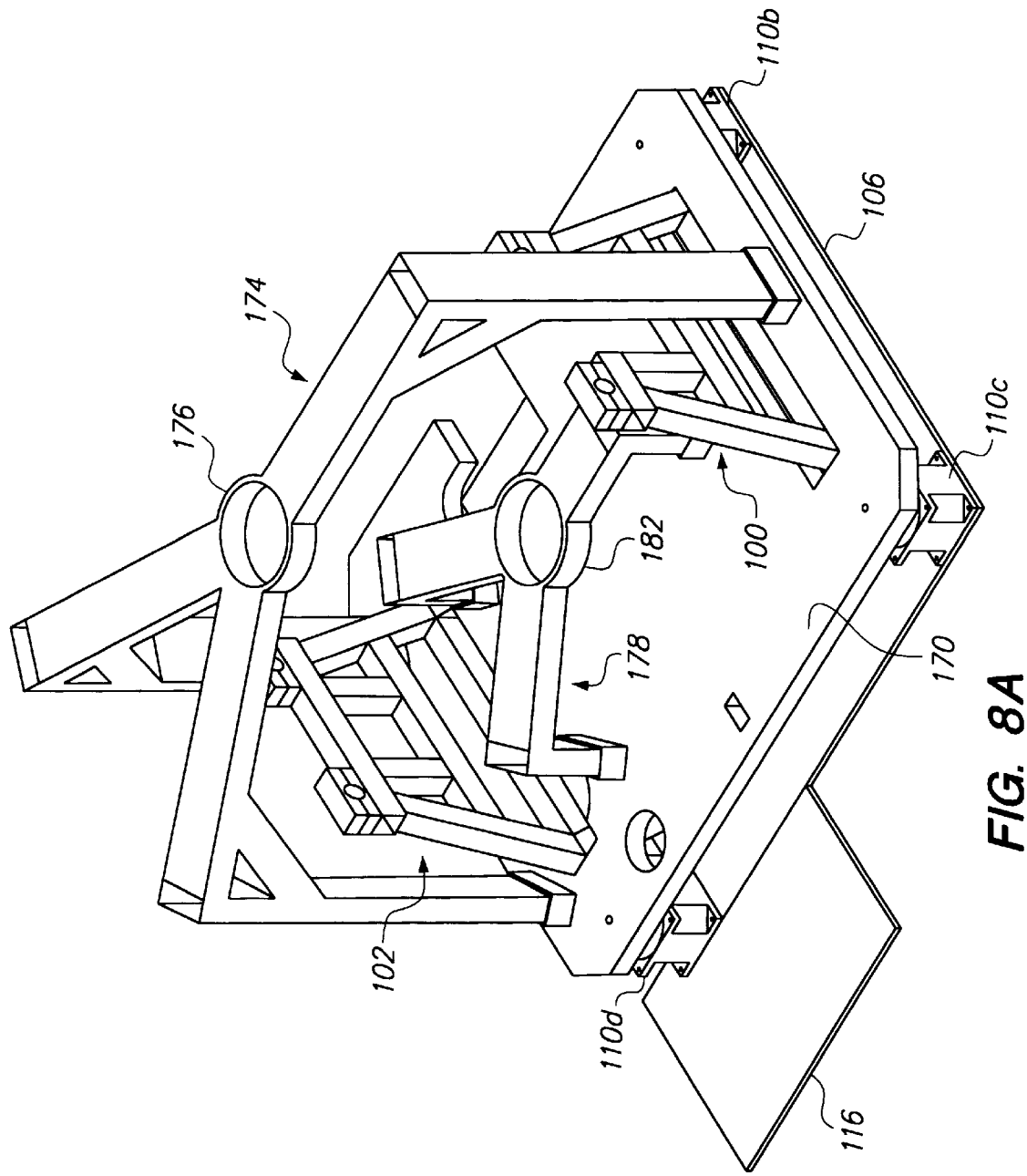
FIG. 8A shows the support structure for the electron beam column and the associated seismic plate and foundation.

FIG. 8A relates most closely to FIG. 6A and shows some of the same structures but with the vacuum enclosure and its contents removed, for clarity. In this cases shown resting on the vertical isolation pads 110b, 110c, 110d is the seismic plate 170 which is a large massive, e.g. steel, plate through which the vertical reaction frame structures 100, 102 penetrate without touching. Note that openings through seismic plate 170 allow passage of structures 100, 102. Resting on the seismic plate 170 is a lower electron beam column mount 178 which is both a horizontal and vertical structure with a central collar 182 for holding the electron beam column, not shown for simplicity. A similar upper electron beam column support structure 174 also rests on seismic plate 170 with its central collar 176. Collars 176 and 182 are coaxial and of the appropriate size to hold the conventional electron beam column rigidly in place. It is to be appreciated that the support elements are a large heavy structure weighing together several tons and composed of for instance steel beams and plates.

Figure 8B:
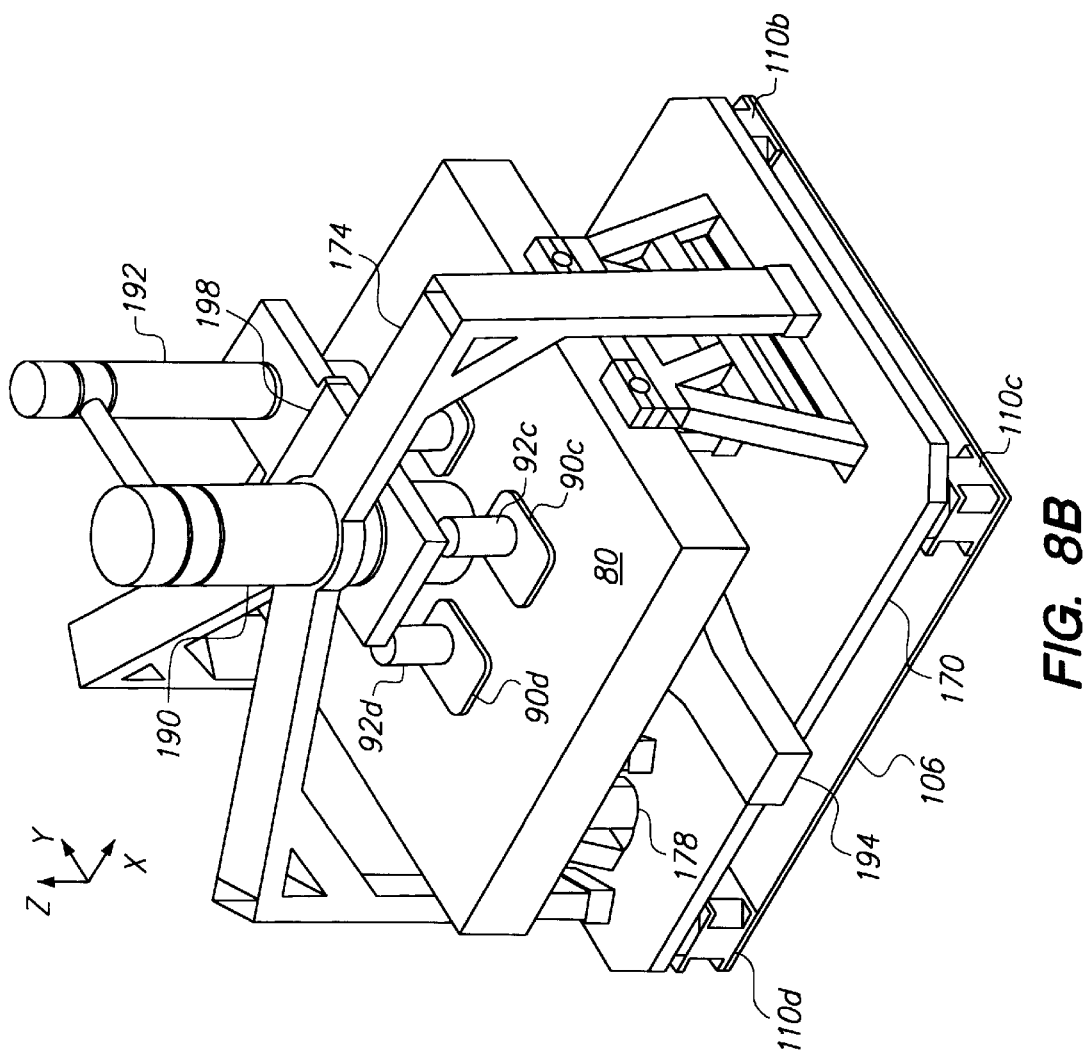
FIG. 8B shows the structure of FIG. 9 with the addition of the reticle stage assembly and the electron beam column.

FIG. 8B shows the combination of the structures of FIGS. 6A and 8A, showing how they fit together. Also shown is the electron beam column 190, and its auxiliary structure 192 which is for purposes of connecting the vacuum source to the various parts of the system. The lower electron beam support structure 178 is only partially visible since it is mostly hidden by the vacuum enclosure 80. Shown extending from the lower portion is structure 194 which is part of the wafer stage. For purpose of orientation, the x, y, z axes are illustrated in FIG. 8B. As an example of relative dimensions, from the seismic plate 170 to the top of the electron beam column 190 is approximately 2.7 meters in one embodiment and a width along the y-axis of the plate 170 is 2.2 meters. The length of seismic plate 170 along the x-axis is approximately 2.8 meters. (Of course this is merely illustrative.) Auxiliary plate 116 and the foundation itself are not shown here, for purposes of simplicity. Vacuum lock 198 allows maintenance on the lower portion of the electron beam column without losing vacuum in the upper portion of the column.

FIG. 9 shows the structure of FIG. 8B in a partial cross-section showing only portions of the support structures for simplicity and also showing the portions underlying the foundation plate 106. It is to be understood that in FIG. 8B foundation plate 106 rests on the actual foundation. Most of the elements shown in FIG. 9 are identical to those shown in the earlier figures. FIG. 9 is a cross-section view of the structure for instance of FIG. 8B from the right side and shows many of the structural components in very simplified form including those internal to the stage assembly and the preload and spherical bearings associated therewith. Elements shown in FIG. 9 not shown in the other figures include a reticle stage vacuum enclosure support 206 which extends down to the seismic plate 170 and is rigidly attached thereto. Of course typically there would be three or four such support structures rather than only the one illustrated. Structure 208, not shown in detail, is the z-force actuator referred to above providing a maximum vertical travel for instance of plus or minus 1.5 millimeters and is supported on foundation plate 106 by support structure 184.

The z-axis plate 160 is movable in the z-direction (vertically) under the influence of several (e.g. three) force transducers in structure 208. The upper part of each force transducer thus extends through the vacuum enclosure 80. The force transducers in one embodiment are each a pneumatic (air pressure) device and stepper motor to bear the weight of the stage assembly and support plate in combination with an electrical "clapper" to provide a countervailing force to pull down the support plate against the pneumatic force; for detail of one embodiment see above-referenced copending U.S. application Ser. No. 09/289,249 filed Apr. 9, 1999.

The lower portion of the electron beam column 190 extends down to a wafer stage enclosure 210 which is not shown in any detail herein and rests on seismic plate 170. Typically enclosure 210 includes an X-Y stage for supporting and moving the workpiece (wafer) as needed. This is typically a conventional stage.

Underlying the foundation plate 106 is the actual foundation, for instance of concrete which is in a large cavity dug through the factory floor 220 and is in three dimensions isolated therefrom by a compliant material layer 228, for instance rubber. The underlying dirt 224 of the earth is also shown for purposes of understanding. Of course this particular installation is merely exemplary and not limiting.

This disclosure is illustrative and not limiting; further modifications will be apparent to one skilled in the art in light of this disclosure and are intended to fall within the scope of the appended claims.

What is claimed is:

1. A stage assembly comprising:

a frame;

a magnet support structure moving within the frame in a first direction under the influence of a first linear motor, the first linear motor having two elements, a first of the two elements being mounted on the frame and a second of the two elements being mounted on the magnet support structure, the magnet support structure defining an opening and having a first linear motor magnet element and a second linear motor magnet element mounted on opposite sides of the opening;

a stage moving in a second direction perpendicular to the first direction inside the opening relative to the magnet support structure, the stage including at least one motor coil at either end and moving in the second direction back and forth under the influence of the motor coils interacting with the first and second linear motor magnet elements; wherein in a first position of the stage the motor coil at a first end of the stage is inside a magnetic field of the first linear motor magnet element and the motor coil at the second end of the stage is substantially outside the magnetic field of the second linear motor magnet element, and at a second position of the stage the motor coil at the first end of the stage is substantially outside the magnetic field of the first linear motor magnet element and the motor coil at the second end of the stage is inside the magnetic field of the second linear motor magnet element.

2. The stage assembly of claim 1, further comprising a linear induction motor for driving the stage in the second direction relative to the magnet support structure.

3. The stage assembly of claim 2, wherein the linear induction-motor includes a coil mounted on the magnet support structure and an associated conductive plate on the stage.

4. The stage assembly of claim 2, further comprising a second linear induction motor for moving the stage in the second direction relative to the magnet support structure and exerting a force on the stage in a direction opposite to that exerted by the first linear induction motor.

5. The stage assembly of claim 1, further comprising an additional linear motor having two co-operating elements, one mounted on each of the stage and the magnet support structure, for moving the stage in the first direction relative to the magnet support structure.

6. The stage assembly of claim 1, wherein the stage includes a top plate and a bottom plate coupled by supports, and defining an interior cavity for support of an object, and wherein interior surfaces of the stage are reflective and in communication with an exterior of the stage, thereby to reflect incident interferometer beams.

7. The stage assembly of claim 1, further comprising a vacuum enclosure surrounding the magnet support structure and the stage, a portion of the frame extending exterior of the enclosure.

8. The stage assembly of claim 1, wherein the frame includes a plurality of supports extending laterally, and further comprising:
   a plate which bears the weight of the stage, wherein the laterally extending supports are supported on a foundation independent of the plate; and
   an electron beam column located to direct an electron beam onto the stage, whereby reaction forces used to move the stage relative to the frame are transferred to the foundation independent of supports for the electron beam column.

9. The stage assembly of claim 1, further comprising a plate bearing the weight of the stage, and at least three spherical bearings each bearing between the stage and the plate, thereby allowing the stage to move in the first and second directions relative to the plate.

10. The stage assembly of claim 9, wherein the spherical bearings are each of silicon nitride, and bear on silicon nitride surfaces on the support surface.

11. The stage assembly of claim 9, further comprising a mechanism for positioning the spherical bearings relative to the stage and the plate.

12. The stage assembly of claim 9, further comprising a preload structure comprising:
   at least three loading plates for applying force to the stage in the direction of gravity; and
   at least three spherical bearings each bearing between a loading plate and the stage.

13. The stage assembly of claim 9, wherein each spherical bearing is laterally surrounded by a lubricating bushing.

14. The stage assembly of claim 9, wherein the frame is supported on a foundation independent of the support surface.

15. The stage assembly of claim 14, further comprising an electron beam column located to direct an electron beam onto the stage, wherein the electron beam column is supported independent of the frame.

* * * * *